United States Patent Office.

J. G. HESTER, OF RALEIGH, NORTH CAROLINA.

Letters Patent No. 69,210, dated September 24, 1867.

---

IMPROVED BURNING-FLUID.

---

The Schedule referred to in these Letters Patent and making part of the same.

---

TO ALL WHOM IT MAY CONCERN:

Be it known that I, J. G. HESTER, of the city of Raleigh, Wake county, State of North Carolina, have invented a new and useful improvement in Burning-Fluid for illuminating purposes, which I designate as "Estrella Fluid." The following is a full description thereof.

As the base of this improved burning-fluid, I take the naphtha of coal-oil. The whole of the ingredients used, and proportions of the same, are as follows: Forty gallons naphtha, ten ounces sweet spirits of nitre, one and three-quarters pound common potash, six ounces gum-camphor, six and three-quarter ounces alum, two and three-quarter pounds common salt, four ounces chloride of lime, three and a quarter ounce oil sassafras, three ounces sulphur, two ounces charcoal.

The mode of manufacturing this new and improved burning-fluid is as follows: Open the barrel of naphtha in a secure place, by taking out the bung. Put in all the other ingredients except the oil of sassafras. Let it stand twenty-four hours. Then put in the oil of sassafras, and let it stand twenty-four hours longer, with the bung out, shaking it frequently. At the expiration of the forty-eight hours, as described above, the naphtha will have gone through a chemical change, to the effect that it will then produce a light as soft as a candle and as bright as gas, without smoking or leaving an unpleasant odor.

This can be used in lamps of the lowest cost.

What I claim as my invention, and desire to secure by Letters Patent of the United States, is—

The improved burning-fluid, prepared of the materials substantially as herein described.

J. G. HESTER.

Witnesses:
    JAMES H. CAUSTEN,
    CHRISTIAN KAUFMAN.